April 22, 1952  H. R. REYNOLDS  2,593,919
THRUST BEARING
Filed March 20, 1948

INVENTOR
Harry R. Reynolds
BY
ATTORNEYS

Patented Apr. 22, 1952

2,593,919

UNITED STATES PATENT OFFICE 2,593,919

THRUST BEARING

Harry R. Reynolds, New Britain, Conn., assignor to The Fafnir Bearing Company, New Britain, Conn., a corporation of Connecticut Application March 20, 1948, Serial No. 16,060

7 Claims. (Cl. 308—41)

My invention relates to a bearing and more particularly to a thrust bearing for car axles, shafts for heavy rolls, and the like.

It is an object of my invention to provide an improved bearing of the character indicated.

It is another object to provide an improved means for absorbing end thrusts in bearings of the character indicated.

It is a specific object to meet the above objects with as compact an arrangement as possible, that is, with an assembly requiring a minimum of axial space in a device of the character indicated.

Other objects and various further features of the invention will be pointed out or will occur to those skilled in the art from a reading of the following specification in conjunction with the accompanying drawings. In said drawings, which show, for illustrative purposes only, a preferred form of the invention:

Briefly stated, my invention contemplates a compact structure for absorbing end thrusts in railway or the like bearings, in which an axle or shaft is axially movable and in which axial shock may be severe. My bearing means may serve as an adjunct to the conventional radial-bearing suspension within a bearing box. I employ a thrust bearing including inner and outer rings with antifriction elements therebetween; the inner bearing ring may be and preferably is maintained in direct thrust-receiving relation with the axially movable shaft, and the outer bearing ring may be axially displaceable and spring urged toward the shaft. In the forms to be described an axially compact, and at the same time circumferentially uniform, application of spring pressures is accomplished by the use of oppositely dished frusto-conical resilient washers, such as are frequently known by the name "Belleville springs."

Figure 1:
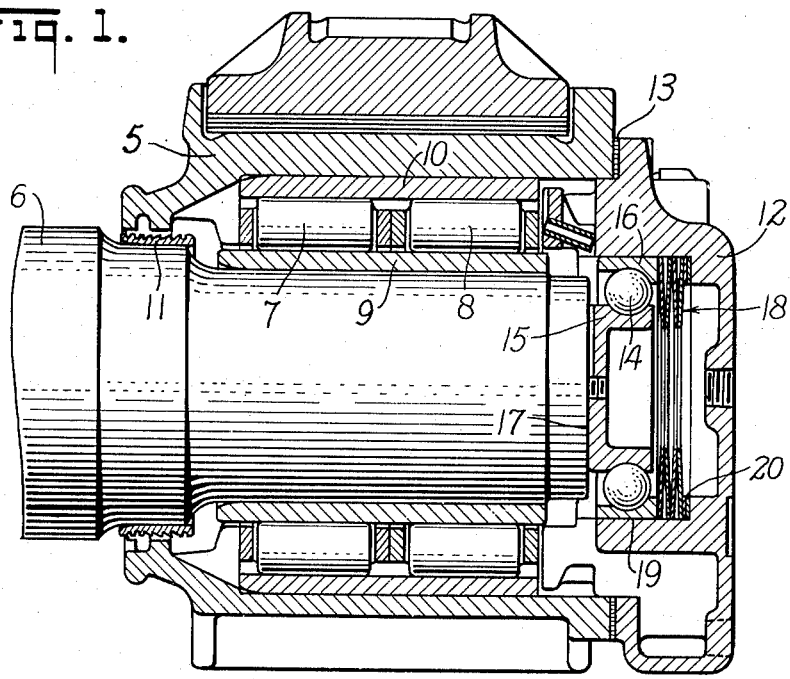
Fig. 1 is a vertical sectional view of a railway journal box to which my novel thrust-bearing means has been applied.

Referring to Fig. 1 of the drawings, my invention is shown in application to a bearing box 5, which may be the journal box for a railway journal 6. The radial load within the box 5 may be carried by twin sets of roller bearings 7—8 riding between an inner ring or sleeve 9 and an outer ring or sleeve 10. The inner axial end of the journal box 5 may be sealed, as by a member 11, and the outer axial end may be closed as by a cover 12. A gasket 13 is shown to complete a seal of the cover 12 to the main body or housing of the journal box 5.

Since the bearings 7—8 carry substantially only a radial load, the journal 6 is slidable axially within the box 5, and end thrusts may be severe. In accordance with the invention, I provide improved means for relieving shock that accompany such end thrusts. For this purpose, I employ an angular contact bearing including antifriction elements 14 riding between an inner race ring 15 and an outer race ring 16. The inner race ring 15 is preferably in direct thrust-receiving relation with the axle 6, and in the form shown the ring 15 directly abuts the end of axle 6. If desired, the inner ring 15 may be specially formed with a surface 17 of relatively extended area for extensive contact with the end of axle 6.

The thrust-bearing unit is axially displaceable and may be urged toward the axle 6 under the influence of spring means 18. The outer bearing ring 16 is preferably guided by a suitable bore within the box 5, or within a part (such as the cover 12) fixed to the box 5, for a proper maintenance of concentricity. In the form shown, the spring means 18 comprises a number of oppositely dished frusto-conical spring washers. These washers may be of substantially the same diameter as the bore 19 in which the outer bearing ring 16 is guided so that a substantially uniform distribution of spring forces may be maintained on the outer bearing ring 16. If desired, means such as shims 20 may be seated in the bore 19 to limit the travel of the journal, it being understood that the principal purpose of spring means 18 is assurance of constant contact of the inner bearing ring 15 with the end of journal 6, so that the inner ring 15 may always rotate with the journal.

Figure 2:
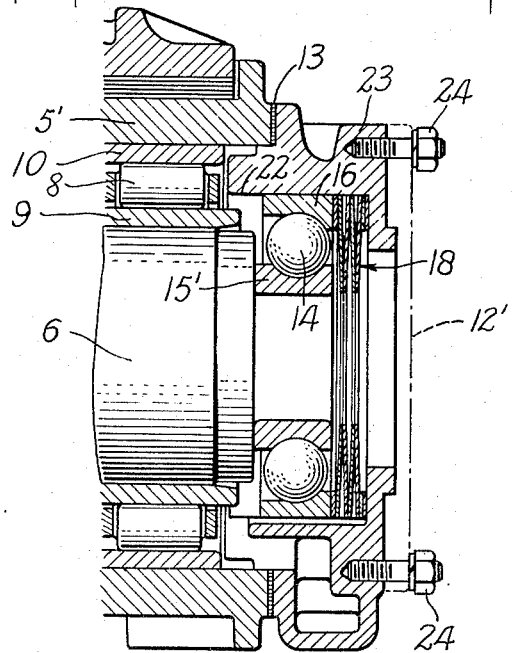
Fig. 2 is a fragmentary view similar to Fig. 1, but illustrating a modified arrangement according to the invention.

In Fig. 2, I show a modified thrust-absorbing assembly in which the outer ring 16 of the thrust bearing is guided within a bore 22 in a mounting block 23, which may be secured by means not shown to the main frame 5' of the journal box, and which may thus be considered effectively a part of the journal-box housing proper. Again, the inner bearing ring 15' may directly abut the end of the shaft 6, and the outer bearing ring may be constantly urged by spring means 18 toward the shaft 6. A cover plate 12' (shown in dotted outline) may complete the assembly upon a tightening of securing screws 24. It will be understood that in certain applications the arrangement of Fig. 2 may be useful in permitting access to certain parts within the journal box assembly without releasing the desired resilient setting and assembly of the thrust bearing 14.

Figure 3:
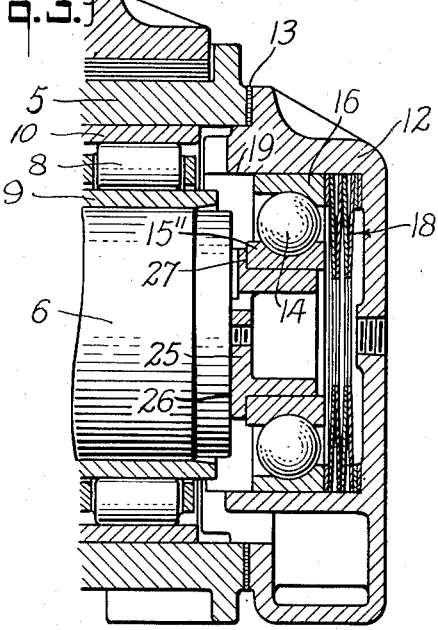
Fig. 3 illustrates a further modification.

In Fig. 3, I show a still further modification of the invention wherein a complete conventional or stock thrust bearing may be applied. In the thrust bearing of Fig. 3, the inner ring 15'' is conventional, and a desired extensive end contact with axle 6 may be obtained by mounting ring 15'' upon an adapter fitting or member 25 having a relatively extensive surface 26 for contact with the shaft 6. The inner ring 15'' is preferably seated against suitable abutment means carried with the adapter member 25, and in the form shown, the inner ring 15 rests against a shoulder 27. As in the case of Fig. 1, the thrust bearing of Fig. 3 may ride slidably in a bore 19 in a cover for the journal box 5, and spring means such as oppositely dished frusto-conical washers 18 may be employed to urge the outer bearing 16 constantly toward the axle 6.

It will be appreciated that I have described a relatively simple thrust-bearing assembly having particular utility in application to axially slidable shafts such as railway journals. By the use of springs, such as the springs 18, the axial space required of the thrust-absorbing parts may be held to a minimum, as when it may be desired to adapt my thrust bearing to a presently installed journal box. Arrangement is such that, whether the thrust bearing is carried with the journal-box frame or with the cover of the journal box, substantial areas of contact may be effectively obtained between the inner ring of the thrust bearing and the shaft; at the same time, the mass of the rotating parts in direct abutment with the axle (i. e. of the inner bearing ring 15, 15', 15'', with its adapter 25, if one is used) may be held to a minimum. There may thus be substantially no tendency for slip between these parts, so that wear may also be held to a minimum. The saving of axial space may be sufficient to permit the use of stock thrust bearings with an adapter and still to secure the above-indicated advantages, as in the case of Fig. 3.

As a further feature of my thrust-shock absorbing means, it will be noted that the thrust bearing is supported by the bore 19 for unitary sliding movement, and that the circumferentially uniform thrust provided by the conical spring means 18 may constantly resiliently urge the whole bearing against the end of shaft 6. Since the inner bearing ring (or adapter 25, if one is used) is thus always held against the shaft 6, there may be the fullest possible assurance of rotation of the inner ring (15, 15', 15''), so that axial shocks may have a minimum destructive or wearing effect upon the anti-friction elements 14 and upon the raceways of both the inner and outer rings.

As indicated, the principal purpose of the spring means 18 is to assure that the inner ring of the thrust bearing may be kept in constant rotation as the journal 6 rotates. At the same time, it will be seen that the spring means 18 may serve as spacer shims during instants of high peak axial thrust, in limiting the axial displacement of the journal. A certain amount of lateral motion of the axle in railway service is necessary for best riding qualities, and in previous arrangements damage has resulted to a thrust bearing if the loading axle has directly impacted a stationary or an insufficiently rotating thrust bearing. In the present arrangement, the fact that the thrust bearing is always rotating when peak thrust loads are delivered indicates that static impact cannot take place and that race indentation or brinelling may not occur.

While I have described my invention in detail for the preferred forms shown, it will be understood that modifications may be made within the scope of the invention as defined in the appended claims.

I claim:

1. In a device of the character indicated, a bearing box having an enlarged guide bore at one end thereof, a bearing therein for radial loads, an axially movable shaft radially supported by said bearing, thrust-receiving bearing means including radially disposed inner and outer ring members with anti-friction elements therebetween, said outer ring being slidably guided in said bore and said inner ring integrally including an axial end surface of relatively extended area for end contact with said shaft, and spring means located by said bore and resiliently and circumferentially continuously urging the outer of said ring members with said inner ring in constant contact with the adjacent end of said shaft, whereby said thrust-bearing means may be urged as a unit toward said shaft.

2. In a device of the character indicated, a bearing box, a bearing therein for receiving radial load, an axially movable shaft in said bearing, said box having an elongated guide bore generally concentric with said shaft, said bore being continuously cylindrical and having an inner end substantially adjacent the radial plane of the adjacent end of said shaft, a thrust-receiving bearing including radially spaced rings with anti-friction elements therebetween, the outer ring being axially slidably guided in said bore, the inner ring being in direct unsprung thrust-receiving relation with said shaft, and spring means including oppositely dished frusto-conical washers guided by said bore and in substantially circumferentially continuously urging contact with said outer bearing ring, whereby said thrust bearing may be urged as a unit toward said shaft and may constantly be supported with a maximum sliding contact area.

3. A device according to claim 2, in which said box includes a main housing and cover means over an axial end thereof, and in which said guide bore is in said cover means.

4. A device according to claim 2, in which said box includes a housing and cover means for one axial end thereof, and in which said guide bore is formed in said housing.

5. In a device of the character indicated, a bearing box including a housing unit and a cover unit for one axial end thereof, one of said units having an elongated continuous axially extending guide bore, an axially movable shaft journalled in said bearing box and having an end in a radial plane substantially adjacent a part of said bore, a thrust bearing including radially opposed inner and outer rings with antifriction elements therebetween, said outer ring being slidably guided in said guide bore for the full extent of axial movement of said shaft in said box, and circumferentially uniform resilient means circumferentially contacting said outer ring and urging said thrust bearing toward said shaft, said inner ring being in effective unsprung abutting relation with the end of said shaft.

6. A device according to claim 5, in which said resilient means includes a plurality of oppositely dished frusto-conical washers guided by said bore, whereby said washers may assure constant rotation of said bearing with rotation of said shaft and whereby during instants of peak thrust loads said washers may be compressed to serve as spacer shims in limiting axial travel of said shaft.

7. In a device of the character indicated, a journal box to receive one end of a shaft axially slidable relative to said box, radial-bearing means for the shaft in said box, said box having a guide bore at one end thereof and in alignment with said radial-bearing means, thrust-bearing means including radially opposed inner and outer rings with anti-friction elements therebetween, said outer ring being slidably guided in said bore, said inner ring being positioned for direct thrust-receiving relation with the end of the shaft, and preloaded annular spring means guided in said bore for circumferentially uniform axial preload of said outer-bearing ring, said inner ring having a central axial opening whereby axial access may be had within said thrust-bearing means and said spring means for operation of train-control devices or the like from the shaft journal.

HARRY R. REYNOLDS.

REFERENCES CITED

The following references are of record in the file of this patent:

UNITED STATES PATENTS

| Number | Name | Date |
|---|---|---|
| 1,002,442 | Perkins | Sept. 5, 1911 |
| 1,102,547 | Rockwell | July 7, 1914 |
| 2,094,968 | Searles | Oct. 5, 1937 |
| 2,102,952 | Hellyar | Dec. 21, 1937 |
| 2,155,657 | Hellyar | Apr. 25, 1939 |

FOREIGN PATENTS

| Number | Country | Date |
|---|---|---|
| 520,356 | France | June 24, 1921 |